United States Patent
Song et al.

(10) Patent No.: US 9,532,045 B2
(45) Date of Patent: Dec. 27, 2016

(54) METHOD AND DEVICE FOR ENCODING/ DECODING IMAGE HAVING REMOVABLE FILTERING MODE

(75) Inventors: Jinhan Song, Seoul (KR); Jeongyeon Lim, Gyeonggi-do (KR); Yonggoo Kim, Seoul (KR); Yoonsik Choe, Gyeonggi-do (KR); Yung Ho Choi, Gyeonggi-do (KR); Jinwoo Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 794 days.

(21) Appl. No.: 13/811,995

(22) PCT Filed: Aug. 12, 2011

(86) PCT No.: PCT/KR2011/005970
§ 371 (c)(1),
(2), (4) Date: May 22, 2013

(87) PCT Pub. No.: WO2012/021040
PCT Pub. Date: Feb. 16, 2012

(65) Prior Publication Data
US 2013/0230106 A1 Sep. 5, 2013

(30) Foreign Application Priority Data

Aug. 12, 2010 (KR) ................ 10-2010-0077637

(51) Int. Cl.
*H04N 7/26* (2006.01)
*H04N 19/50* (2014.01)
(Continued)

(52) U.S. Cl.
CPC ...... *H04N 19/00569* (2013.01); *H04N 19/117* (2014.11); *H04N 19/136* (2014.11); *H04N 19/176* (2014.11); *H04N 19/463* (2014.11)

(58) Field of Classification Search
CPC ................................ H04N 19/00569
(Continued)

(56) References Cited

U.S. PATENT DOCUMENTS

2003/0138150 A1* 7/2003 Srinivasan ........... H04N 19/136
382/238
2005/0243915 A1* 11/2005 Kwon ................. H04N 19/159
375/240.03
(Continued)

FOREIGN PATENT DOCUMENTS

KR 10-2006-0129096 12/2006
KR 10-2007-0076357 7/2007
(Continued)

OTHER PUBLICATIONS

International Search Report mailed Mar. 28, 2012 for PCT/KR2011/005970, citing the above reference(s).
(Continued)

*Primary Examiner* — Yulin Sun
(74) *Attorney, Agent, or Firm* — Hauptman Ham, LLP

(57) ABSTRACT

A video encoding/decoding method and apparatus that may omit a filtering mode is provided. The video encoding/ decoding method and apparatus may determine whether to perform filtering on the intra-predicted image for the purpose of obtaining a natural intra-predicted image by using a characteristic of neighboring pixels or an intra-predicted image and thus, may omit additional information for indicating whether filtering is required and improves the performance of compression.

28 Claims, 7 Drawing Sheets

(51) Int. Cl.
*H04N 19/176* (2014.01)
*H04N 19/117* (2014.01)
*H04N 19/463* (2014.01)
*H04N 19/136* (2014.01)

(58) Field of Classification Search
USPC .................................. 375/240.01, 240.13
See application file for complete search history.

(56) References Cited

U.S. PATENT DOCUMENTS

2011/0026599 A1* 2/2011 Andersson ............ H04N 19/176
   375/240.16
2012/0027313 A1* 2/2012 Xu ........................ H04N 19/105
   382/233

FOREIGN PATENT DOCUMENTS

| KR | 10-0871588 | 12/2008 |
| KR | 10-2010-0045007 | 5/2010 |

OTHER PUBLICATIONS

Ken McCann et al; Samsung's Response to the Call for Proposals on Video Compression Technology; Samsung Electronics Co. Ltd. And British Broadcasting Corporation; Joint Collaborative Team on Video Coding (JCT-VC) of ITU-T SG16 WP3 and ISO/IEC JTC1/SC29/WG11; 1st Meeting: Dresden, DE, Apr. 15-23, 2010; pp. 1-40.

* cited by examiner

METHOD AND DEVICE FOR ENCODING/DECODING IMAGE HAVING REMOVABLE FILTERING MODE

CROSS REFERENCE TO RELATED APPLICATION

This application claims the priority of Korean Patent Application No. 10-2010-0077637, filed on Aug. 12, 2010 in the KIPO (Korean Intellectual Property Office). Further, this application is the National Phase application of International Application No. PCT/KR2011/005970 filed on Aug. 12, 2011, which designates the United States and was published in Korean.

TECHNICAL FIELD

The present disclosure in one or more embodiments relates to a video encoding/decoding method and apparatus that may omit a filtering mode. More particularly, the present disclosure in one or more embodiments relates to a video encoding/decoding method and apparatus that may omit a filtering mode, and determine whether to perform filtering by using a characteristic of a neighboring pixel or intra-predicted image when filtering is performed on the intra-predicted image to obtain a natural intra-predicted image, and thus, may omit additional information indicating whether filtering is required and can improve the performance of compression.

BACKGROUND

The statements in this section merely provide background information related to the present disclosure and may not constitute prior art.

H.264/AVC is the latest video compression standard, and is developed by JVT (Joint Video Team) formed of MPEG (Moving Picture Experts Group) and VCEG (Video coding Experts Group). H.264/AVC improves a compression rate 2 times greater than MPEG-2, and 1.5 times greater than MPEG-ASP (Advanced Simple Profile) using technologies such as intra-prediction, ¼ unit-based variable block size motion estimation/compensation, entropy encoding such as CAVLC (Context-adaptive variable-length coding) and CABAC (Context-adaptive binary arithmetic coding), and the like.

Among the technologies of H.264/AVC, the intra-prediction coding that is used for removing the spatial similarity of an image may perform prediction/compensation on a pixel value of a current block to be encoded, using a neighboring pixel that is already encoded as illustrated in FIG. 1. This method has been developed based on the idea in which spatially neighboring pixel values have a high correlation or high similarity to each other.

For more improving the efficiency of the intra-prediction, a possible method is to perform adaptive filtering on a predicted image which underwent the intra-prediction. The method may generate the intra-predicted image to be more natural by performing low-pass filtering on the intra-predicted image and thus, the compression efficiency may be improved. When the low-pass filtering is applied to an intra-predicted image that includes a clear directional edge, the blurring artifact may occur to blur the intra-predicted image, which will rather deteriorate the prediction efficiency. To overcome this, a filtering mode for the intra-predicted image may be used as illustrated in FIG. 2, so that whether to use a low-pass filter may be adaptively determined for each intra-predicted block and the problem may be settled. In this case, however, since the filtering mode will need to be transmitted for each intra-predicted block, the encoding efficiency generally deteriorates in the case of a video dominated by prediction images requiring no filtering.

DISCLOSURE

Technical Problem

An embodiment of the present disclosure is to prevent the deterioration of encoding efficiency due to unnecessary spending of the transmission band for filtering modes in such cases where a filtering gives a little improvement of prediction accuracy or there are a significant number of prediction blocks disusing the filtering, by adaptively omitting information on modes of such filtering reflecting the characteristic distribution of neighboring pixel values under availability of automatic detection of whether to do filtering or not, thereby obtaining more excellent reconstructed image quality.

SUMMARY

An embodiment of the present disclosure provides a video encoding/decoding apparatus, including: a video encoder for generating an intra-predicted block by predicting pixels of a current block based on pixels of a neighboring block, generating a predicted block by selectively performing filtering on the intra-predicted block based on a correlation among the pixels of the neighboring block or a correlation among pixels of the intra-predicted blocks, generating a residual block by subtracting the predicted block from the current block, generating a transformed and quantized residual block by transforming and quantizing the residual block, and encoding the transformed and quantized residual block; and a video decoder for reconstructing a transformed and quantized residual block from encoded data received, reconstructing a residual block by inverse-quantizing and inverse-transforming the reconstructed transformed and quantized residual block, generating an intra-predicted block by predicting pixels of a current block based on pixels of a neighboring block, generating a predicted block by selectively performing filtering on the intra-predicted block based on a correlation among the pixels of the neighboring block or a correlation among pixels of the intra-predicted block, and reconstructing the current block by adding the reconstructed residual block and the predicted block.

Another embodiment of the present disclosure provides a video encoding apparatus, including: an intra-predictor for predicting pixels of a current block by using pixels of a neighboring block to generate an intra-predicted block, and selectively performing filtering on the intra-predicted block based on a correlation among the pixels of the neighboring block or a correlation among pixels of the intra-predicted block to generate a predicted block; a subtractor for subtracting the predicted block from the current block to generate a residual block; a transformer and quantizer for transforming and quantizing the residual block to generate a transformed and quantized residual block; and an encoder for encoding the transformed and quantized residual block.

Another embodiment of the present disclosure provides a video decoding apparatus, including: a decoder for reconstructing a transformed and quantized residual block from encoded data received; an inverse-quantizer and inverse-transformer for reconstructing a residual block by inverse-quantizing and inverse-transforming the transformed and quantized residual block; an intra-predictor for generating an intra-predicted block by predicting pixels of a current block by using pixels of a neighboring block, and for generating a predicted block by selectively performing filtering on the intra-predicted block based on a correlation among the pixels of the neighboring block or a correlation among pixels of the intra-predicted block; and an adder for reconstructing the current block by adding the reconstructed residual block and the predicted block.

Another embodiment of the present disclosure provides a video encoding/decoding method, including: performing a video encoding for generating an intra-predicted block by predicting pixels of a current block by using pixels of a neighboring block, generating a predicted block by selectively performing filtering on the intra-predicted block based on a correlation among the pixels of the neighboring block or a correlation among pixels of the intra-predicted block, generating a residual block by subtracting the predicted block from the current block, generating a transformed and quantized residual block by transforming and quantizing the residual block, and encoding the transformed and quantized residual block; and performing a video decoding for reconstructing a transformed and quantized residual block from encoded data received, reconstructing a residual block by inverse-quantizing and inverse-transforming the reconstructed transformed and quantized residual block, generating an intra-predicted block by predicting pixels of a current block by using pixels of a neighboring block, generating a predicted block by selectively performing filtering on the intra-predicted block based on a correlation among the pixels of the neighboring block or a correlation among pixels of the intra-predicted block, and reconstructing the current block by adding the reconstructed residual block and the predicted block.

Another embodiment of the present disclosure provides a video encoding method, including: performing an intra-prediction for predicting pixels of a current block by using pixels of a neighboring block to generate an intra-predicted block, and selectively performing filtering on the intra-predicted block based on a correlation among the pixels of the neighboring block or a correlation among pixels of the intra-predicted block to generate a predicted block; subtracting the predicted block from the current block to generate a residual block; transforming and quantizing the residual block to generate a transformed and quantized residual block; and encoding the transformed and quantized residual block.

Another embodiment of the present disclosure provides a video decoding method, including: performing a decoding for reconstructing a transformed and quantized residual block from encoded data received; inverse-quantizing and inverse-transforming the transformed and quantized residual block to reconstruct a residual block; performing an intra-prediction for generating an intra-predicted block by predicting pixels of a current block by using pixels of a neighboring block, and for generating a predicted block by selectively performing filtering on the intra-predicted block based on a correlation among the pixels of the neighboring block or a correlation among pixels of the intra-predicted block; and adding the reconstructed residual block and the predicted block to reconstruct the current block.

Advantageous Effects

According to the present disclosure as described above, whether to perform filtering is determined based on a characteristic of a neighboring pixel or an intra-predicted image and thus, additional information for indicating whether filtering is required may be omitted and the performance of compression may be improved.

DETAILED DESCRIPTION

Figure 1:
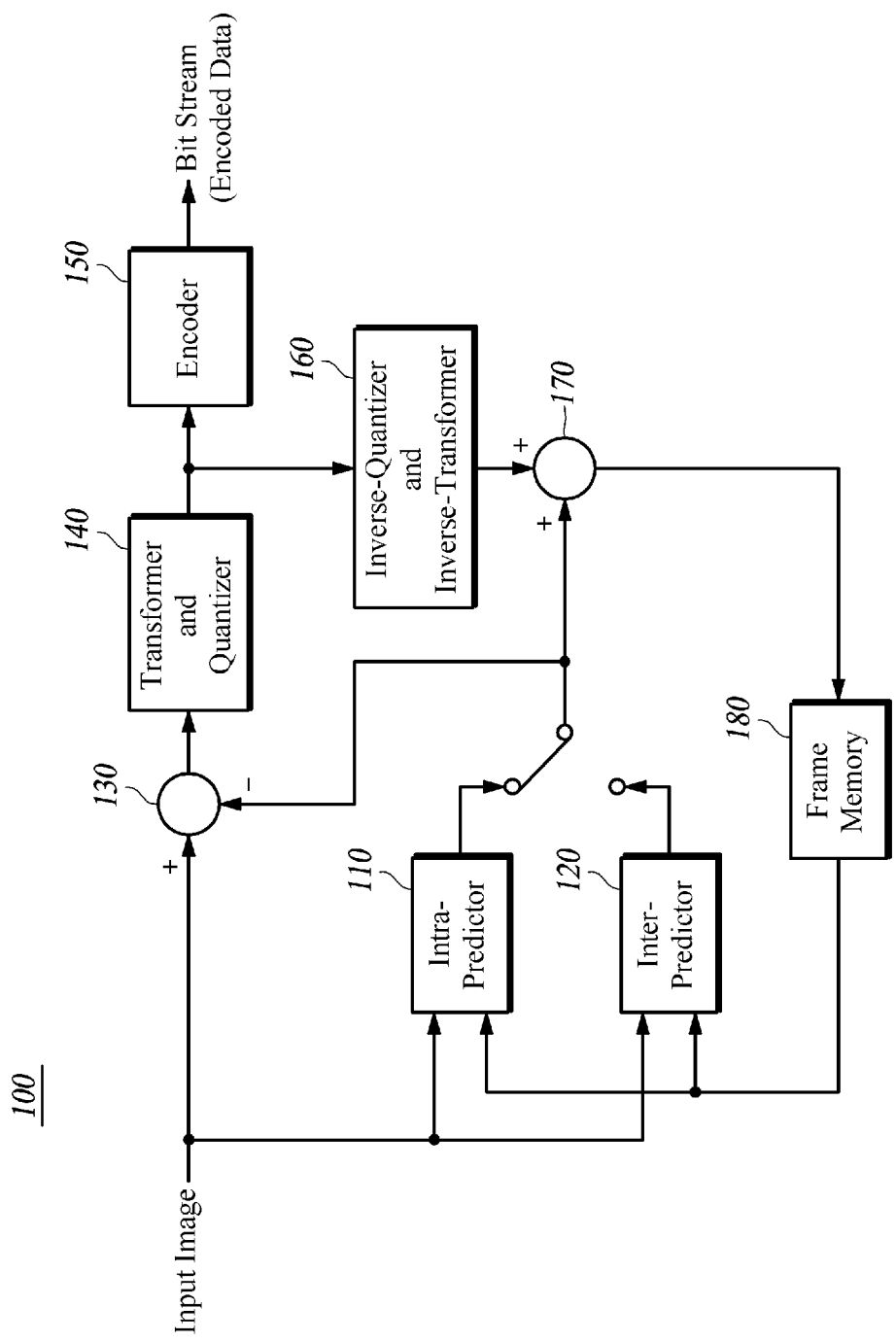
FIG. 1 is a block diagram schematically illustrating a video encoding apparatus according to an embodiment of the present disclosure.

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus and a video decoding apparatus may correspond to a user terminal such as a PC (Personal Computer), a notebook computer, a PDA (Personal Digital Assistant), a PMP (Portable Multimedia Player), a PSP (PlayStation Portable), a wireless communication terminal, a smart phone, and the like, may correspond to a server terminal such as an application server, a service server, and the like, or may correspond to various devices including a communication device such as a communication modem that performs communication with various devices or wired/wireless communication networks, a memory that stores various programs and data that encode or decode an image or perform inter/intra-prediction for encoding or decoding, a microprocessor to execute a program so as to perform calculation and controlling, and the like.

In addition, the image encoded into a bitstream by the image encoding apparatus may be transmitted in real time or non-real time to the image decoding apparatus for decoding the same where it is reconstructed and reproduced into the image after being transmitted through a wired/wireless communication network such as the Internet, a short range wireless communication network, a wireless LAN network, a WiBro (Wireless Broadband, aka WiMax) network, or a mobile communication network, or through various communication interfaces such as a cable and a USB (universal serial bus).

Usually, a moving picture may be formed of a series of pictures, and each picture is divided into predetermined regions such as frames or blocks. A region of an image may be divided into blocks, which may be classified into an intra-block and an inter-block based on an encoding scheme. The intra-block means a block that is encoded based on an intra-prediction coding scheme. The intra-prediction coding scheme predicts pixels of a current block by using pixels of previously reconstructed blocks after being encoded and decoded in a current picture to be encoded, so as to generate a predicted block, and encodes a differential value with the pixels of the current block. The inter-block means a block that is encoded based on an inter-prediction coding scheme. The inter-prediction coding scheme predicts a current block in a current picture referring to one or more past pictures or future pictures, so as to generate a predicted block, and encodes its differential value with the current block. Here, a frame that is referred to when the current picture is encoded or decoded may be referred to as a reference frame.

FIG. 1 is a block diagram schematically illustrating a video encoding apparatus according to an embodiment of the present disclosure.

A video encoding apparatus 100 according to an embodiment of the present disclosure includes an intra-predictor 110, a inter-predictor 120, a subtractor 130, a transformer and quantizer 140, an encoder 150, an inverse-quantizer and inverse-transformer 160, an adder 170, and a frame memory 180.

An input image desired to be encoded may be input in macro block units. In the present disclosure, the macro block is in an M×N form, M and N may have a size of $2^n$, and M and N may be the same or may be different from each other. Therefore, the macro block may be larger or equal to a macro block of H.264.

The predictor (the intra-predictor 110 or the inter-predictor 120) may generate a predicted block by predicting a current block. That is, the predictor (the intra-predictor 110 or the inter-predictor 120) may predict a pixel value of each pixel of the current block to be encoded in an image, and may generate a predicted block having a predicted pixel value of each pixel. Here, the predictor (the intra-predictor 110 or the inter-predictor 120) may predict the current block through intra-prediction performed by the intra-predictor 110 or the inter-prediction performed by the inter-predictor 120.

The inter-predictor 120 may generate a predicted block by using a different frame so as to predict a current macro block. That is, the inter-predictor 120 generates a motion vector through motion estimation based on a mode of the inter-predictor 120 in a previous frame that already passed through an encoding process and was decoded, and generates a predicted block in a motion compensation process by using the motion vector.

The intra-predictor 110 generates an intra-predicted block by predicting pixels of a current block by using neighboring block pixels, and generates a predicted block by selectively performing filtering on the intra-predicted block based on a correlation among neighboring block pixels or a correlation among pixels of the intra-predicted block. That is, the intra-predictor 110 may generate the predicted block based on a mode of the intra-predictor 110 by using neighboring pixels of a current macro block that already passes an encoding process and is decoded.

The subtractor 130 generates a residual block by subtracting a predicted block from a current block. That is, the subtractor 130 calculates a difference between a pixel value of each pixel of the current block to be encoded and a pixel value of the predicted block generated from the intra-predictor 110 or the inter-predictor 120, so as to generate the residual block having a residual signal in a form of a block.

The transformer and quantizer 140 transforms and quantizes the residual block generated from the subtractor 130 into a frequency coefficient so as to generate a transformed and quantized residual block. Here, a transforming scheme for transforming an image signal in a spatial region into a frequency domain may be used, such as Hadamard Transform, Discrete Cosine Transform Based Integer Transform (hereinafter referred to as 'Integer Transform'). As a quantizing scheme, DZUTQ (Dead Zone Uniform Threshold Quantization, hereinafter referred to as 'DZUTQ') or Quantization Weighted Matrix, and the like may be used.

The encoder 150 encodes the residual block transformed and quantized by the transformer and quantizer 140 so as to generate encoded data.

An Entropy Encoding scheme may be used as the encoding scheme, but the present disclosure is not limited thereto and various encoding schemes may be used.

In addition, the encoder 150 includes, in the encoded data, a bitstream obtained by encoding quantized frequency coefficients and various information required for decoding the encoded bitstream. That is, the encoded data may include a first field including a bitstream obtained by encoding a CBP (Coded Block Pattern), a Delta Quantization Parameter and a quantization frequency coefficient, a second field including bits for information required for prediction (for example, an intra-prediction mode in the case of intra-prediction, a motion vector in the case of inter-prediction, and the like), and the like.

The inverse-quantizer and inverse-transformer 160 inverse-quantizes and inverse-transforms the transformed and quantized residual block that is transformed and quantized by the transformer and quantizer 140, so as to reconstruct a residual block. The inverse-quantization and inverse-transform may be the inverse process of the transform and quantization performed by the transformer and quantizer 140. That is, the inverse-quantizer and inverse-transformer 160 may perform inverse-quantization and inverse-transform by inversely performing the transform and quantization scheme performed by the transformer and quantizer 140 based on information associated with transform and quantization (for example, information associated with a transform and quantization type) that is generated and transferred from the transformer and quantizer 140.

The adder 170 reconstructs a current block by adding the predicted block predicted by the predictor (110 or 120) and the residual block inverse-quantized and inverse-transformed by the inverse-quantizer and inverse-transformer 160.

The frame memory 180 stores the block reconstructed by the adder 170, and uses the stored block as a reference block to generate a predicted block during intra or inter-prediction.

Figures 2, 3:
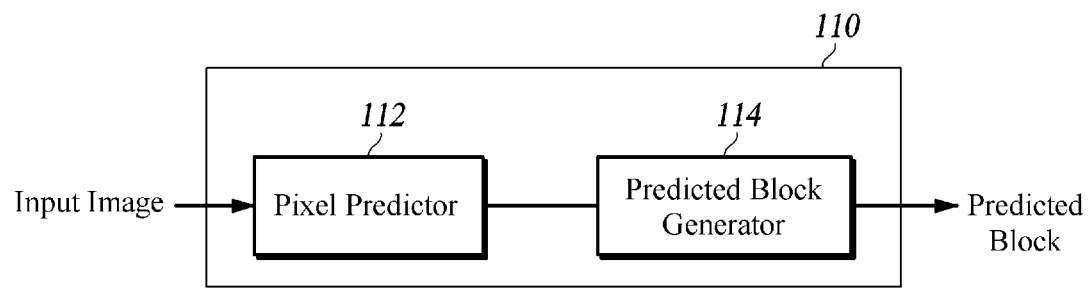
FIG. 2 is a diagram illustrating a configuration of an intra-predictor 110.
FIG. 3 is a diagram illustrating pixels (a~p) of a current block in a size of 4×4 and pixels (A~M) neighboring the current block.

FIG. 2 is a diagram illustrating a configuration of the intra-predictor 110.

As illustrated in FIG. 2, the intra-predictor 110 may be configured to include a pixel predictor 112 and a predicted block generator 114.

Figure 4:
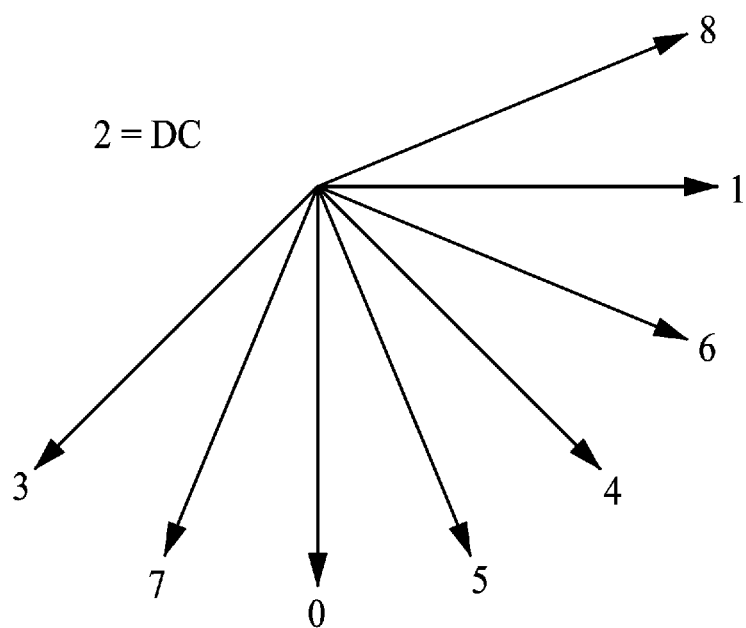
FIG. 4 is a diagram illustrating directions of nine intra-prediction modes of H.264/AVC.

FIG. 3 is a diagram illustrating pixels (a~p) of a current block in a size of 4×4 and pixels (A~M) neighboring the current block. FIG. 4 is a diagram illustrating directions of 9 intra-prediction modes of H.264/AVC.

The pixel predictor 112 predicts pixels of a current block by using neighboring block pixels so as to generate an intra-predicted block. The pixel predictor 112 may use various schemes such as directivity prediction, weighted prediction, template-based prediction, and the like by using the neighboring pixels of the current block so as to predict the current block. For example, when the pixels a~p of the current block are predicted by using the pixels A~M neighboring the current block as shown in FIG. 3, a predicted image may be generated through one of the 9 directivity prediction methods of FIG. 4. In this example, the predicted image may be an intra-predicted block having predicted pixels of a' through p' (the prediction result of the pixel a is referred to as a', the pixel b is b', . . . , and the pixel p is p').

The predicted block generator 114 generates a predicted block by selectively performing filtering on the intra-predicted block based on a correlation among the neighboring block pixels or a correlation among pixels of the intra-predicted block.

The predicted block generator 114 performs filtering on the intra-predicted block when it is determined that filtering is required based on the correlation among the neighboring block pixels or the correlation among the pixels of the intra-predicted block. This is a case where a single filtering mode is used. When a plurality of filtering modes is available, filtering mode information may be extracted and filtering may be performed based on the filtering mode. The process of extracting the filtering mode information will be described later.

The predicted block generator 114 may determine whether to perform filtering on the intra-predicted block by using pixels a'~p' of the intra-predicted block.

Filtering on the intra-predicted block is performed after the intra-predicted block is generated and thus, an encoder/decoder may be aware of pixel information a'~p' associated with the intra-predicted block before the filtering is performed.

For example, according to a DC mode (mode number 2) among the nine intra-prediction modes of FIG. 4, the pixels a'~p' of the intra-predicted block may be generated based on an average value of the neighboring pixels A through M and thus, values of all pixels in the intra-predicted block may be filled with the same value. In this example, therefore, since the values of the predicted pixels a'~p' of the intra-predicted block are the same, filtering is not required. That is, when the intra-prediction mode is DC, it may be determined that filtering mode information associated with the intra-predicted block is omitted and filtering is not performed.

According to other modes excluding the DC mode, whether to perform filtering on the intra-predicted block may be determined by using the pixels a' p' of the intra-predicted block. In the case of a flat intensity image of which pixels in the intra-predicted block have similar values, prediction filtering is not necessary. Therefore, when the pixels a'~p' of the intra-predicted blocks have similar values (that is, values having a high correlation), filtering may not need to be performed and thus, the predicted block generator 114 may omit generating filtering mode information.

Although the predicted block generator 114 may use a standard deviation or variance among pixels a'~p' of the intra-predicted block as a method of determining the correlation among the pixels a'~p' of the intra-predicted block, the present disclosure is not limited thereto and may use various methods.

A standard deviation $s_{predictor}$ of pixels of an intra-predicted block may be calculated based on Equation 1.

$$\sigma_{predictor} = \sqrt{\frac{1}{N}\sum_{k=1}^{N_P}(s_k - m_p)^2} \qquad \text{Equation 1}$$

In Equation 1, $S_k$ denotes pixels a'~p' of an intra-predicted block, $m_p$ denotes an average of predicted pixels, and $N_p$ denotes the number of intra-predicted pixels, for example, 16 in the case of FIG. 1.

In Equation 1, as the value of the standard deviation $s_{predictor}$ is closer to 0, it is understood that a correlation among the pixels a'~p' of the intra-predicted block is higher.

Figure 5:
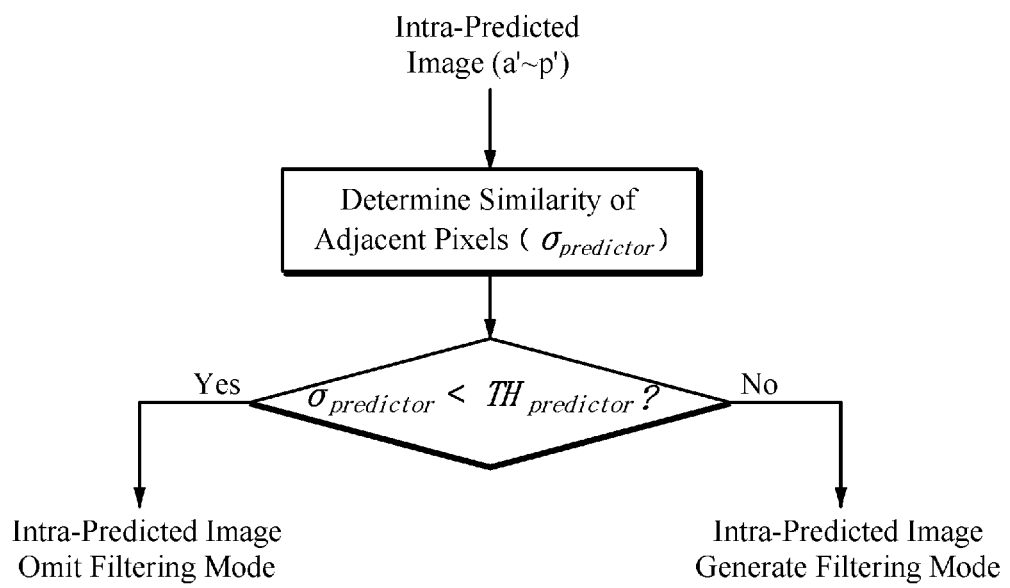
FIG. 5 is a diagram illustrating whether a predicted block generator 114 generates a filtering mode based on a value of a standard deviation ($s_{predictor}$)

FIG. 5 is a diagram illustrating whether the predicted block generator 114 generates a filtering mode based on a value of a standard deviation $s_{predictor}$.

When the value of standard deviation $s_{predictor}$ calculated based on Equation 1 is less than a predetermined threshold value $TH_{predictor}$, it may be determined that pixels in that intra-predicted block are similar to each other and filtering is not required to dispense with generating the filtering mode.

$TH_{predictor\_m}$ may be expressed by a function of a quantization step $Q_{step}$ of Equation 2.

$$TH_{predictor} = \text{round}\left(\frac{Q_{step}}{4}\right) \qquad \text{Equation 2}$$

Here, a round (x) function is a function that rounds a value x to be an integer.

The predicted block generator 114 may determine whether to generate a filtering mode and whether to perform filtering based on whether Equation 3 is satisfied.

$$\sigma_{predictor} < TH_{predictor} \qquad \text{Equation 1}$$

In other words, when Equation 3 is not satisfied, the predicted block generator 114 performs filtering and generates a mode of the performed filtering (when there is a plurality of available filtering modes) and a predicted block generated from the filtering. If Equation 3 is satisfied, filtering on an intra-predicted block is not required, and in this example, the predicted block generator 114 determines the intra-predicted block to be a predicted block.

The filtering may be performed by using a predetermined filter so that the predicted block becomes similar to a current block. During the filtering, the intra-predicted block may be iteratively performed using a plurality of filters to the number of, for example, n (n is an integer greater than or equal to 1). Either the n filters may be used entirely or filtering may be iteratively performed k times using only a few filters to the number of k (k=n). There may be unlimited methods of determining filters to be used for the filtering, and a filter may be made available for use based on, for example, a natural image such as a Field of Expert (FoE) model. Accordingly, different filtering modes may be generated based on the type of filter used for filtering or the number of filters, and the different filtering modes may be selected based on pixel information of a current intra-predicted block. Therefore, when the predicted block generator 114 generates a predicted block by selecting a mode from a plurality of filtering modes and performing filtering on an intra-predicted block, the filtering mode may be also transmitted to the encoder 150 where it is encoded.

The predicted block generator 114 may determine whether to perform filtering on an intra-predicted block by using neighboring pixels A~M.

The reason for performing the filtering is to generate the intra-predicted block to be a natural image. When neighboring pixel values are similar to each other, the generated intra-predicted block may become a natural image that may not have discontinuity with neighboring blocks. In this example, therefore, filtering on the intra-predicted block may not need to be performed. For example, when all the values of neighboring pixels A through M are 'N' in FIG. 3, the pixels a'~p' of the intra-predicted block may also have the same value as the values of the neighboring pixels A through M, that is, 'N'. Accordingly, filtering may not need to be applied to the intra-predicted block and the predicted block generator 114 may determine the intra-predicted block to be a predicted block.

Therefore, when the neighboring pixels A~M have similar values (that is, values having a high correlation) in the present disclosure, filtering on the intra-predicted block may be omitted. The predicted block generator 114 may determine the intra-predicted block to be the predicted block.

A neighboring pixel is a pixel that is reconstructed after encoding and thus, a decoder may also be aware of whether filtering mode information is generated by using information of the neighboring pixel.

Equation 4 is an equation that calculates a correlation among neighboring pixels A through M.

$$\sigma_{reference} = \sqrt{\left(\sum_{k=1}^{U}(u_k - m)^2 + \sum_{k=1}^{L}(l_k - m)^2\right) / (U + L)}$$ Equation 4

Here, $u_k$ denotes a neighboring pixel located on top of the intra-predicted block as with A, B, C, D, E, F, G and H of FIG. 3, and $I_k$ denotes a neighboring pixel located on the left of the intra-predicted block as with I, K, J, and L. U denotes the number of pixels located on the top of the intra-predicted block, which is 8 in the case of FIG. 3. L denotes the number of pixels located on the left of the intra-predicted block, which is 4 in the case of FIG. 3. m denotes an average of the neighboring pixels A through M.

The similarity (correlation) of the neighboring pixels may be obtained based on a standard deviation of pixels on the top and the left of a current block to be encoded. When the standard deviation $s_{reference}$ is used as a reference for indicating the similarity of the neighboring pixels, the similarity of the neighboring pixels may be determined based on Equation 4. As a value of the standard deviation $s_{reference}$ is closer to 0, the similarity is higher.

Figure 6:
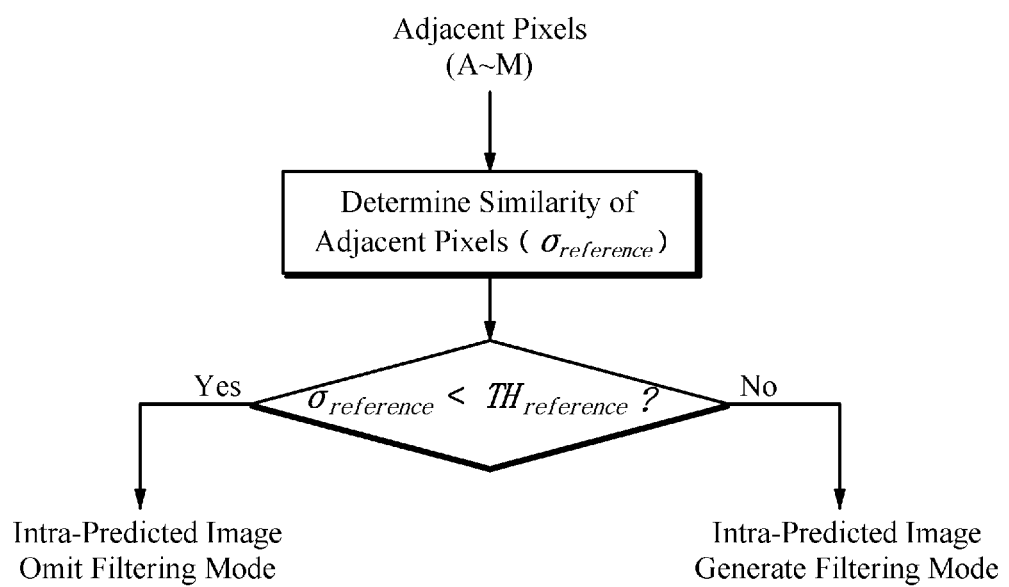
FIG. 6 is a diagram illustrating whether a predicted block generator 114 generates a filtering mode based on a value of a standard deviation ($s_{reference}$)

FIG. 6 is a diagram illustrating whether a predicted block generator 114 generates a filtering mode based on the value of a standard deviation $s_{reference}$.

When a value of the standard deviation $s_{reference}$ calculated based on Equation 4 is less than a predetermined threshold $TH_{reference}$, pixels in a corresponding intra-predicted block may be considered as having a high correlation to determine that there is no need for a filtering and thus skip generating a filtering mode.

$TH_{reference}$ may be expressed as a function of a quantization step $Q_{step}$ as shown in Equation 5.

$$TH_{reference} = \text{round}\left(\frac{Q_{step}}{4}\right)$$ Equation 5

Here, a round (x) function is a function that rounds an x value to be an integer.

The predicted block generator 114 determines whether to generate a filtering mode and whether to perform filtering based on whether Equation 6 is satisfied.

$$\sigma_{reference} < TH_{reference}$$ Equation 6

Specifically, when Equation 6 is not satisfied, the predicted block generator 114 may perform filtering and generate mode information of the performed filtering and the resultant predicted block.

When Equation 6 is satisfied, filtering on an intra-predicted block is not required and thus the predicted block generator 114 determines the intra-predicted block to be a predicted block.

In a case where the predicted block generator 114 generates the predicted block, when certain contour information is included in a reference pixel of a neighboring block of a current block to be intra-predicted, filtering may not be performed to skip encoding the information of the filtering mode.

In the presence of pixels a~p of a current block in a size of 4×4 and pixels A~M neighboring the current block as illustrated in FIG. 3, the neighboring reference pixels M, A, B, C, M on the top side are defined to be $U_k$, and the neighboring reference pixels M, I, J, K, and L on the left side are defined to be $L_k$.

In addition, filtered neighboring reference pixels on the top side obtained by applying a low-pass filter on the neighboring reference pixels M, A, B, C, . . . , M on the top side are defined to be $U_F$, and filtered neighboring reference pixels on the left side obtained by applying a low-pass filter on the neighboring reference pixels M, L, J, K, and L on the left side are defined to be $L_F$.

The result obtained by applying a low-pass filter may have a value similar to an average value of pixels, due to the inherent nature. Accordingly, if strong contour information exists in neighboring reference pixels on the top side or neighboring reference pixels on the left side, gradual changes can be anticipated with the values of pixels on the left and the right of a point where the contour exists so that the values increase or decrease from the average. To embody this idea, a non-filtered pixel value for each pixel is subtracted from a filtered pixel value of the same pixel and the sign of the difference is defined by Equation 7.

$$S_k^u = \begin{cases} 1 (\text{if, } U_k > U_F) \\ 0 (\text{if, } U_k = U_F) \\ -1 (\text{if, } U_k < U_F) \end{cases}$$ Equation 7

(Provided, $F \in \{M, A, B, \ldots, H\}$)

$$S_k^l = \begin{cases} 1 (\text{if, } L_k > L_F) \\ 0 (\text{if, } L_k = L_F) \\ -1 (\text{if, } L_k < L_F) \end{cases}$$

(Provided, $F \in \{M, I, J, K, L\}$)

Equation 8 is for calculating a maximum value $L_u$ from among the numbers of consecutive occurrences of 1 and −1 in $s_k^u$, and a maximum value $L_l$ from among the numbers of consecutive occurrences of 1 and −1 in $s_k^l$.

$$L_u = \max(c_u^1, c_u^{-1})$$

$$L_l = \max(c_l^1, c_l^{-1}) \quad \text{Equation 8}$$

Here, $c_u^1$ denotes the maximum number of consecutive occurrences of 1 in $s_k^u$, and $c_u^{-1}$ denotes the maximum number of consecutive occurrences of $-1$ in $s_k^u$, and $c_l^1$ denotes the maximum number of consecutive occurrences of 1 in $s_k^l$, and $c_l^{-1}$ denotes the maximum number of consecutive occurrences of $-1$s in $s_k^l$.

For example, if $U_k$ is 100, 102, 98, 100, 120, 135, 150, 148, and 154 and $U_F$ is 100, 100, 104, 111. 120, 131. 140, 146, and 152, then $s_k^u$ becomes 0, 1, $-1$, $-1$, 0, 1, 1, 1, and 1. Therefore, $c_u^1$ is 4 and $c_u^{-1}$ is 2 and thus, $L_u$ is calculated to be 4 based on Equation 8. $L_l$ may be calculated in the same manner as $L_u$.

Therefore, when Equation 9 or Equation 10 is satisfied, there is no filtering performed and thus no encoding of a filtering mode.

$$L_u > TH_L \quad \text{Equation 9}$$

Based on a result of comparison between $L_u$ and a predetermined threshold value $TH_u$ in Equation 9, when $L_u$ is greater than the threshold value $TH_u$, filtering may not be performed and a filtering mode may not be encoded.

$$L_l > TH_l \quad \text{Equation 10}$$

If a comparison between $L_l$ and a predetermined threshold value $TH_l$ in Equation 10 finds that $L_l$ is greater than the threshold value $TH_l$, neither filtering nor encoding of a filtering mode may not be performed.

Figure 7:
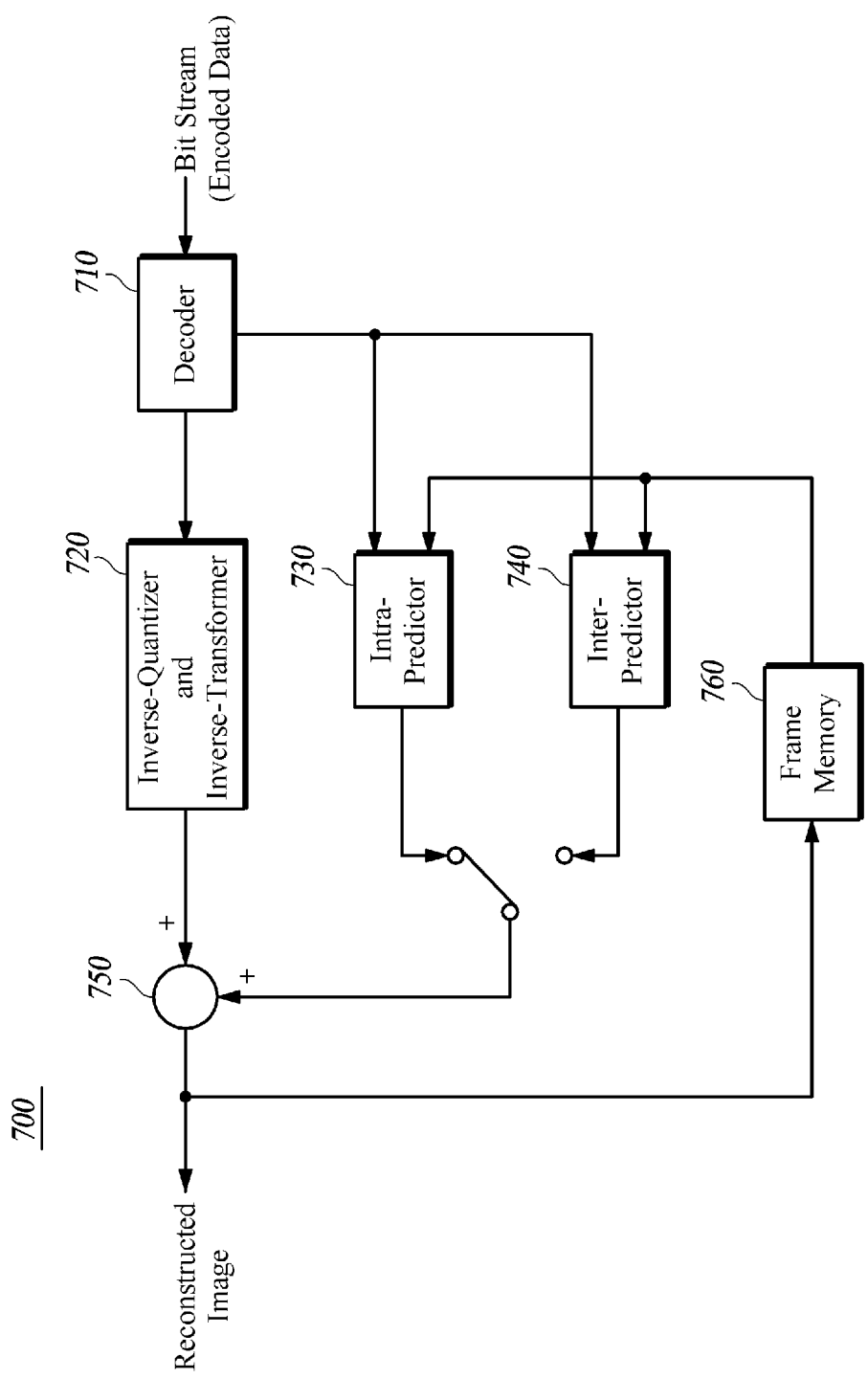
FIG. 7 is a block diagram schematically illustrating a configuration of a video decoding apparatus according to an embodiment of the present disclosure.

FIG. 7 is a block diagram for schematically illustrating a configuration of a video decoding apparatus according to an embodiment of the present disclosure.

A video decoding apparatus 700 according to an embodiment of the present disclosure may be configured to include a decoder 710, an inverse-quantizer and inverse-transformer 720, an intra-predictor 730, an inter-predictor 740, an adder 750, and a frame memory 760.

The decoder 710 reconstructs a transformed and quantized residual block and information required for decoding, by receiving encoded data.

The decoder 710 may decode the encoded data so as to extract information required for block decoding. The decoder 710 may extract and decode an encoded residual block from a first field included in the encoded data, may extract information required for prediction from a second field included in the encoded data, and may transfer the extracted information required for prediction to the intra-predictor 730 or the inter-predictor 740.

The inverse-quantizer and inverse-transformer 720 may inverse-quantize and inverse-transform the decoded transformed and quantized residual block so as to reconstruct a residual block.

The predictor (the intra-predictor 730 or the inter-predictor 740) generates a predicted block by predicting a current block. In this example, the corresponding predictor (the intra-predictor 730 or the inter-predictor 740) may predict the current block in the same manner as the predictor (intra-predictor 110 or the inter-predictor 120) of the video encoding apparatus 100.

The adder 750 reconstructs the current block by adding the residual block reconstructed by the inverse-quantizer and inverse-transformer 720 and the predicted block generated by the predictor 740. The current block reconstructed by the adder 750 may be transferred to the frame memory 760 and thus, may be utilized for predicting another block in the predictor (either the intra-predictor 730 or the inter-predictor 740).

The frame memory 760 may store a reconstructed image for allowing an intra and inter-predicted block to be generated.

The decoder 710 may decode the encoded data so as to decode or extract not only the transformed and quantized residual block but also the information required for decoding. References to the information required for decoding mean to represent information required for decoding an encoded bitstream included in the encoded data, for example, information on a block type, information on an intra-prediction mode if a prediction mode is an intra-prediction mode, information on a motion vector if the prediction mode is an inter-prediction mode, information on a transform and quantization type, and the like, and may include various information other than those mentioned in the foregoing.

The intra-predictor 730 may generate an intra-predicted block by predicting pixels of a current block with the use of neighboring block pixels and generate a predicted block by selectively performing filtering on the intra-predicted block based on a correlation among the neighboring block pixels or a correlation among pixels of the intra-predicted block.

Figure 8:
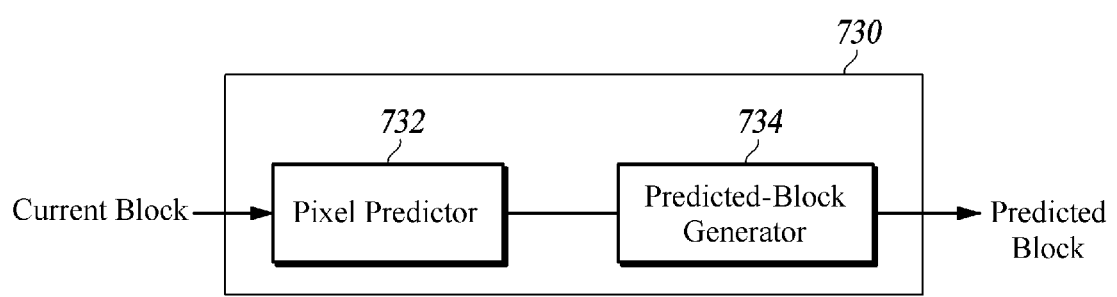
FIG. 8 is a diagram illustrating a configuration of an intra-predictor 730.

FIG. 8 is a diagram illustrating a configuration of the intra-predictor 730.

As illustrated in FIG. 8, the intra-predictor 730 is configured to include a pixel predictor 732 and a predicted block generator 734.

The pixel predictor 732 generates an intra-predicted block by predicting pixels of a current block by using neighboring block pixels.

The predicted block generator 734 generates a predicted block by selectively performing filtering on the intra-predicted block based on a correlation among the neighboring block pixels or a correlation among pixels of the intra-predicted block.

Here, operations of the pixel predictor 732 may be identical to the operations of the pixel predictor 112 of the video encoding apparatus 100 and thus, detailed descriptions thereof will be omitted. In addition, a process that derives the correlation among neighboring block pixels or the correlation among the intra-predicted block pixels from among the operations of the predicted block generator 734 as in the video encoding apparatus 100 may be identical to the operation of the predicted block generator 114 and thus, detailed descriptions thereof will be omitted.

The predicted block generator 734 performs filtering on the intra-predicted block when it is determined to be necessary based on the correlation among the neighboring block pixels or the correlation among the pixels of the intra-predicted block (when the correlation is greater than a threshold value). This represents a case where a single filtering mode is used. When a plurality of filtering modes is available, filtering data is first extracted from encoded data and filtering is performed based on the filtering mode.

If the plurality of filtering modes is available, the filtering mode is extracted from information that is reconstructed by the decoder 710 from the encoded data, and the predicted block generator 734 performs filtering on the intra-predicted block based on the reconstructed filtering mode.

When it is determined that filtering is not required based on the correlation among the neighboring block pixels or the correlation among the pixels of the intra-predicted block, the predicted block generator 734 skips filtering and determines the intra-predicted block to be a predicted block.

The video encoding/decoding apparatus according to an embodiment of the present disclosure may be implemented by connecting an encoded data output end of the video encoding apparatus 100 of FIG. 1 to an encoded data input end of the video decoding apparatus 700 of FIG. 7.

The video encoding/decoding apparatus according to an embodiment of the present disclosure includes a video encoder for generating an intra-predicted block by predicting pixels of a current block based on pixels of a neighboring block, generating a predicted block by selectively performing filtering on the intra-predicted block based on a correlation among the pixels of the neighboring block or a correlation among pixels of the intra-predicted blocks, generating a residual block by subtracting the predicted block from the current block, generating a transformed and quantized residual block by transforming and quantizing the residual block, and encoding the transformed and quantized residual block; and a video decoder for reconstructing a transformed and quantized residual block from encoded data received, reconstructing a residual block by inverse-quantizing and inverse-transforming the reconstructed transformed and quantized residual block, generating an intra-predicted block by predicting pixels of a current block based on pixels of a neighboring block, generating a predicted block by selectively performing filtering on the intra-predicted block based on a correlation among the pixels of the neighboring block or a correlation among pixels of the intra-predicted block, and reconstructing the current block by adding the reconstructed residual block and the predicted block.

Here, the video encoder can be implemented as the video encoding apparatus 100 according to an embodiment of the present disclosure, and the video decoder can be implemented as the video decoding apparatus 700 according to an embodiment of the present disclosure.

A video encoding method according to an embodiment of the present disclosure may include an intra-prediction in step S810 for generating an intra-predicted block by predicting pixels of a current block by using pixels of a neighboring block and generating a predicted block by selectively performing filtering on the intra-predicted block based on a correlation among the pixels of the neighboring block or a correlation among pixels of the intra-predicted block; a subtraction in step S820 for generating a residual block by subtracting the predicted block from the current block; a transform and quantization in step S830 for generating a transformed and quantized residual block by transforming and quantizing the residual block; and an encoding in step S840 for encoding the transformed and quantized residual block.

Here, the intra-prediction process S810 corresponds to the operation of the intra-predictor 110, the subtraction process S820 to the operation of the subtractor 130, the transform and quantization process S830 to the operation of the transformer and quantizer 140, and the encoding process S840 to the operation of the encoder 150 and thus, detailed descriptions thereof will be omitted.

A video decoding method according to an embodiment of the present disclosure includes a decoding in step S910 for reconstructing a transformed and quantized residual block from encoded data receiving; an inverse-quantization and inverse-transform in step S920 for reconstructing a residual block by inverse-quantizing and inverse-transforming the transformed and quantized residual block; an intra-prediction in step S930 for generating an intra-predicted block by predicting pixels of a current block by using pixels of a neighboring block and generating a predicted block by selectively performing filtering on the intra-predicted block based on a correlation among the pixels of the neighboring block or a correlation among pixels of the intra-predicted block; and an adding in step S940 for reconstructing the current block by adding the reconstructed residual block and the predicted block.

Here, the decoding process S910 corresponds to the operation of the decoder 710, the inverse-quantization and inverse-transform process S920 to the operation of the inverse-quantizer and inverse-transformer 720, the intra-prediction process S930 to the operation of the intra-predictor 730, and the adding process S940 to the operation of the adder 750 and thus, detailed descriptions thereof will be omitted.

The video encoding/decoding method according to an embodiment of the present disclosure may be embodied by combining the video encoding method according to an embodiment of the present disclosure and the video decoding method according to an embodiment of the present disclosure.

A video encoding/decoding method according to an embodiment of the present disclosure includes a video encoding process for generating an intra-predicted block by predicting pixels of a current block by using pixels of a neighboring block, generating a predicted block by selectively performing filtering on the intra-predicted block based on a correlation among the pixels of the neighboring block or a correlation among pixels of the intra-predicted block, generating a residual block by subtracting the predicted block from the current block, generating a transformed and quantized residual block by transforming and quantizing the residual block, and encoding the transformed and quantized residual block; and a video decoding process for reconstructing a transformed and quantized residual block from encoded data received, reconstructing a residual block by inverse-quantizing and inverse-transforming the reconstructed transformed and quantized residual block, generating an intra-predicted block by predicting pixels of a current block by using pixels of a neighboring block, generating a predicted block by selectively performing filtering on the intra-predicted block based on a correlation among the pixels of the neighboring block or a correlation among pixels of the intra-predicted block, and reconstructing the current block by adding the reconstructed residual block and the predicted block.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself by way of hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. The computer readable media may include magnetic recording media, optical recording media and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful for application in the fields of a video encoding/decoding method and apparatus that may determine whether to perform filtering based on a characteristic of neighboring pixels or an intra-predicted image and thus, may omit additional information for indicating whether to perform the filtering and improve the performance of video compression.

The invention claimed is:

1. A video encoding apparatus comprising:
an intra-predictor configured to
predict pixels of a current block by using pixels of a neighboring block to generate an intra-predicted block of the current block, the neighboring block being adjacent to the current block, and
selectively perform a filtering on the intra-predicted block based on a correlation among values of pixels of the intra-predicted block to generate a predicted block of the current block;
a subtractor configured to subtract the predicted block from the current block to generate a residual block;
a transformer and quantizer configured to transform and quantize the residual block to generate a transformed and quantized residual block; and
an encoder configured to encode the transformed and quantized residual block,
wherein the filtering is not performed when the correlation is smaller than a threshold, and
the threshold is determined based on a quantization parameter.

2. The apparatus of claim 1, wherein the intra-predictor comprises:
a pixel predictor configured to predict the pixels of the current block by using the pixels of the neighboring block to generate the intra-predicted block; and
a predicted block generator configured to generate the predicted block by selectively performing the filtering on the intra-predicted block based on the correlation among the pixels of the intra-predicted block.

3. The apparatus of claim 1, wherein the intra-predictor configured to perform the filtering on the intra-predicted block when it is determined that the filtering is required based on the correlation among the pixels of the intra-predicted block.

4. The apparatus of claim 3, wherein
the intra-predictor is further configured to generate a filtering mode identifying one of a plurality of filter candidates when it is determined that the filtering is required; and
the encoder is further configured to encode the filtering mode.

5. The apparatus of claim 1, wherein the intra-predictor is configured to determine the intra-predicted block to be the predicted block when it is determined that the filtering is not required based on the correlation among the pixels of the intra-predicted block.

6. The apparatus of claim 1, wherein the correlation is a standard deviation or a variance among the pixels of the intra-predicted block.

7. The apparatus of claim 1, wherein the intra-predictor configured to perform the filtering when the correlation is greater than or equal to a threshold value.

8. A video decoding apparatus comprising:
a decoder configured to reconstruct a transformed and quantized residual block from encoded data received;
an inverse-quantizer and inverse-transformer configured to reconstruct a residual block by inverse-quantizing and inverse-transform the transformed and quantized residual block;
an intra-predictor configured to
generate an intra-predicted block of the current block by predicting pixels of the current block by using pixels of a neighboring block, the neighboring block being adjacent to the current block, and
generate a predicted block of the current block by selectively performing a filtering on the intra-predicted block based on a correlation among values of pixels of the intra-predicted block; and
an adder configured to reconstruct the current block by adding the reconstructed residual block and the predicted block,
wherein the filtering is not performed when the correlation is smaller than a threshold, and
the threshold is determined based on a quantization parameter.

9. The apparatus of claim 8, wherein the intra-predictor comprises:
a pixel predictor configured to generate the intra-predicted block by predicting the pixels of the current block by using the pixels of the neighboring block; and
a predicted block generator configured to generate the predicted block by selectively performing the filtering on the intra-predicted block based on the correlation among the pixels of the intra-predicted blocks.

10. The apparatus of claim 8, wherein the intra-predictor configured to perform the filtering on the intra-predicted block when it is determined that the filtering is required based on the correlation among the pixels of the intra-predicted block.

11. The apparatus of claim 10, wherein
the decoder is further configured to reconstruct a filtering mode from the encoded data, the filtering mode identifying one of a plurality of filter candidates; and
the intra-predictor is configured to perform the filtering on the intra-predicted block based on the filtering mode.

12. The apparatus of claim 8, wherein the intra-predictor is configured to determine the intra-predicted block to be the predicted block when it is determined that the filtering is not required based on the correlation among the pixels of the intra-predicted block.

13. The apparatus of claim 8, wherein the correlation is a standard deviation or a variance among the pixels of the intra-predicted block.

14. The apparatus of claim 8, wherein the intra-predictor configured to perform the filtering when the correlation is greater than or equal to a threshold value.

15. A video encoding method comprising:
performing an intra-prediction for
predicting pixels of a current block by using pixels of a neighboring block to generate an intra-predicted block of the current block, the neighboring block being adjacent to the current block, and selectively performing a filtering on the intra-predicted block based on a correlation among values of pixels of the intra-predicted block to generate a predicted block of the current block;

subtracting the predicted block from the current block to generate a residual block;

transforming and quantizing the residual block to generate a transformed and quantized residual block; and encoding the transformed and quantized residual block, wherein the filtering is not performed when the correlation is smaller than a threshold, and the threshold is determined based on a quantization parameter.

16. The method of claim 15, wherein the process of performing the intra-prediction comprises:

predicting the pixels of the current block by using the pixels of the neighboring block to generate the intra-predicted block; and generating the predicted block by selectively performing the filtering on the intra-predicted block based on the correlation among the pixels of the intra-predicted block.

17. The method of claim 15, wherein in the process of performing the intra-prediction, the filtering is performed on the intra-predicted block when it is determined that the filtering is required based on the correlation among the pixels of the intra-predicted block.

18. The method of claim 17, wherein the process of performing the intra-prediction further comprises generating a filtering mode identifying one of a plurality of filter candidates when it is determined that the filtering is required; and the process of encoding further comprises encoding the filtering mode.

19. The method of claim 15, wherein in the process of performing the intra-prediction, the intra-predicted block is determined as the predicted block when it is determined that the filtering is not required based on the correlation among the pixels of the intra-predicted block.

20. The method of claim 15, wherein the correlation is a standard deviation or a variance among the pixels of the intra-predicted block.

21. The method of claim 15, wherein in the process of performing the intra-prediction, the filtering is performed when the correlation is greater than or equal to a threshold value.

22. A video decoding method comprising:

performing a decoding for reconstructing a transformed and quantized residual block from encoded data received;

inverse-quantizing and inverse-transforming the transformed and quantized residual block to reconstruct a residual block;

performing an intra-prediction for generating an intra-predicted block of a current block by predicting pixels of the current block by using pixels of a neighboring block, the neighboring block being adjacent to the current block, and generating a predicted block of the current block by selectively performing a filtering on the intra-predicted block based on a correlation among values of pixels of the intra-predicted block; and adding the reconstructed residual block and the predicted block to reconstruct the current block, wherein the filtering is not performed when the correlation is smaller than a threshold, and the threshold is determined based on a quantization parameter.

23. The method of claim 22, wherein the process of performing the intra-prediction comprises:

predicting the pixels of the current block by using the pixels of the neighboring block to generate the intra-predicted block; and generating the predicted block by selectively performing the filtering on the intra-predicted block based on the correlation among the pixels of the intra-predicted block.

24. The method of claim 22, wherein in the process of performing the intra-prediction, the filtering is performed on the intra-predicted block when it is determined that the filtering is required based on the correlation among the pixels of the intra-predicted block.

25. The method of claim 24, wherein the process of performing the decoding further comprises reconstructing a filtering mode from the encoded data, the filtering mode identifying one of a plurality of filter candidates; and the process of performing the intra-prediction comprises performing the filtering on the intra-predicted block based on the filtering mode.

26. The method of claim 22, wherein in the process of performing the intra-prediction, the intra-predicted block is determined as the predicted block when it is determined that filtering is not required based on the correlation among the pixels of the intra-predicted block.

27. The method of claim 22, wherein the correlation is a standard deviation or a variance among the pixels of the intra-predicted block.

28. The method of claim 22, wherein in the process of performing the intra-prediction, the filtering is performed when the correlation is greater than or equal to a threshold value.

* * * * *